United States Patent
Akre

(10) Patent No.: US 6,764,258 B1
(45) Date of Patent: Jul. 20, 2004

(54) POSITIONABLE VACUUM CLAMP SYSTEM

(76) Inventor: Brian Akre, 11841 243rd Ave. NW., Zimmerman, MN (US) 55398

( * ) Notice: Subject to any disclaimer, the term of this patent is extended or adjusted under 35 U.S.C. 154(b) by 0 days.

(21) Appl. No.: 10/280,998

(22) Filed: Oct. 25, 2002

(51) Int. Cl.[7] .............................. B23C 9/00; B23Q 3/02
(52) U.S. Cl. ......................................... 409/219; 269/21
(58) Field of Search ............................ 409/219; 269/21

(56) References Cited

U.S. PATENT DOCUMENTS

| | | | | | |
|---|---|---|---|---|---|
| 3,711,082 A | * | 1/1973 | Seidenfaden | .................. | 269/21 |
| 4,336,765 A | * | 6/1982 | Coughlin | ...................... | 269/21 |
| 4,403,567 A | * | 9/1983 | daCosta et al. | ................ | 269/21 |
| 4,799,722 A | * | 1/1989 | Marzinotto | ................ | 294/64.1 |
| 4,984,960 A | * | 1/1991 | Szarka | ......................... | 269/21 |
| 5,180,000 A | * | 1/1993 | Wagner et al. | .............. | 165/80.1 |
| 5,553,839 A | * | 9/1996 | Wolfson et al. | ............. | 271/3.11 |
| 5,775,395 A | * | 7/1998 | Wilkins | ........................ | 269/21 |
| 5,899,445 A | * | 5/1999 | Kimble | ......................... | 269/21 |
| 6,012,208 A | * | 1/2000 | Wiemers | .................... | 29/33 P |
| 6,375,176 B1 | * | 4/2002 | Getchel et al. | ................ | 269/21 |
| 6,439,559 B1 | * | 8/2002 | Kinnard et al. | ................ | 269/21 |
| 6,513,802 B2 | * | 2/2003 | Seger | ........................... | 269/21 |

FOREIGN PATENT DOCUMENTS

| | | | | | |
|---|---|---|---|---|---|
| GB | 2109716 A | * | 6/1983 | ........... | B25B/11/00 |
| GB | 2120141 A | * | 11/1983 | ........... | B25B/11/00 |

* cited by examiner

*Primary Examiner*—A. L. Wellington
*Assistant Examiner*—Dana Ross
(74) *Attorney, Agent, or Firm*—Hugh D. Jaeger

(57) ABSTRACT

A positionable vacuum clamp system including a vacuum table and one or more positionable vacuum clamps which can be of various shapes to accommodate differently shaped workpieces. The positionable vacuum clamp(s) align to the vacuum table having a recessed grid. Each positionable vacuum clamp includes a base plate and a positionable center plate and attached top plate slidingly secured by a retainer washer to the base plate. Vacuum passages within and about the positionable vacuum clamp communicate between the vacuum table and the upper vacuum mating structure of the top plate to vacuumingly secure a workpiece to the top plate for subsequent machining by external equipment.

27 Claims, 15 Drawing Sheets

POSITIONABLE VACUUM CLAMP SYSTEM

CROSS REFERENCES TO RELATED APPLICATIONS

None.

BACKGROUND OF THE INVENTION

1. Field of the Invention

The present invention is for a clamp system, and more particularly is for a positionable vacuum clamp system incorporated for use with CNC milling machines and other production devices.

2. Description of the Prior Art

Prior art clamping devices often require permanent anchoring of a work-piece to a mounting fixture within reach of a cutting, grinding, shaping or other tool. Permanent anchoring often requires drilling of holes in the mounting fixture or involves the use of vise-like clamping arrangements. Such prior art methods can involve a lengthy set-up time and process. Clearly, what is needed is a clamping device which involves a minimum of set-up and alignment procedures, such as is provided by the present invention.

SUMMARY OF THE INVENTION

The general purpose of the present invention is to provide a positionable vacuum clamp system. The positionable vacuum clamp system includes a positionable vacuum clamp and a vacuum table where the positionable vacuum clamp aligningly fits and secures by vacuum to the vacuum table for securing of workpieces to be milled or machined which are held to the positionable vacuum clamp by vacuum. Workpieces which can be milled or machined include items such as, but not limited to, wood, metal, plastics and the like. The vacuum table grid includes substantially square or other suitably-shaped alignment fixtures having intersecting spaces surrounding each alignment fixture into which the lower region of the positionable vacuum clamp aligns. Vacuum ports in the vacuum table are spacingly located in and extending vertically through the alignment fixtures to communicate with the overlying positionable vacuum clamp. Vacuum is applied to secure the positionable vacuum clamp to the vacuum table and to secure the workpiece to a vacuum mating structure at the upper region of the positionable vacuum clamp.

The positionable vacuum clamp is comprised of major components including a base plate, a center plate, a retainer washer slidingly aligned within a central cavity region of the center plate, and a top plate secured to the center plate. The major components are layered and aligned vertically and constructed to allow vacuum to communicate from the lowermost to the uppermost component. The base plate and the retainer washer are fixed in position with respect to each other and to the vacuum table, while the top plate and the center plate, which are connected together, are slidingly positionable as a unit with respect to the vacuum table and with respect to the base plate and the retainer washer. Such slidable positioning allows the positionable vacuum clamp to accommodate and be suitably aligned to the desired profile of the workpiece which is being milled or machined. The top plate can have various upper surface geometrically configured vacuum mating structures depending on the shape and requirements of the milling or machining specifications and attributes.

According to one or more embodiments of the present invention, there is provided a positionable vacuum clamp system including a positionable vacuum clamp and a vacuum table.

One significant aspect and feature of the present invention is a positionable vacuum clamp which includes slidable and positionable components which accommodatingly align to the lower surfaces of a workpiece.

Another significant aspect and feature of the present invention is vacuum communication extending through the vacuum table and the positionable vacuum clamp to secure and hold a workpiece to the upper vacuum mating structure of the positionable vacuum clamp.

Still another significant aspect and feature of the present invention is a positionable vacuum clamp having an attached center plate and top plate which are continuously and slidingly positionable azimuthally along a smooth top surface and about a range of a base plate.

Yet another significant aspect and feature of the present invention is a positionable vacuum clamp having an attached center plate and top plate which are continuously and slidingly positionable about the vertical axis of the attached center plate and top plate.

Yet another significant aspect and feature of the present invention is a positionable vacuum clamp having an attached center plate and top plate which are detentingly and slidingly positionable about the vertical axis of the attached center plate and top plate.

A further significant aspect and feature of the present invention is the use of an optional pivot pin to influence the limit of movement of the attached top plate and center plate to establish one or more stops.

A further significant aspect and feature of the present invention is the use of two or more optional pivot pins to establish one or more predetermined stops for the attached top plate and center plate.

Still another significant aspect and feature of the present invention is the use of recesses adjacent to some of the vacuum mating structures.

Still another significant aspect and feature of the present invention is a top plate which is easily detached should replacement be required due to damage of the top plate by tooling errors.

Having thus described embodiments of the present invention and mentioned some of the significant aspects and features thereof, it is the principal object of the present invention to provide a positionable vacuum clamp system.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
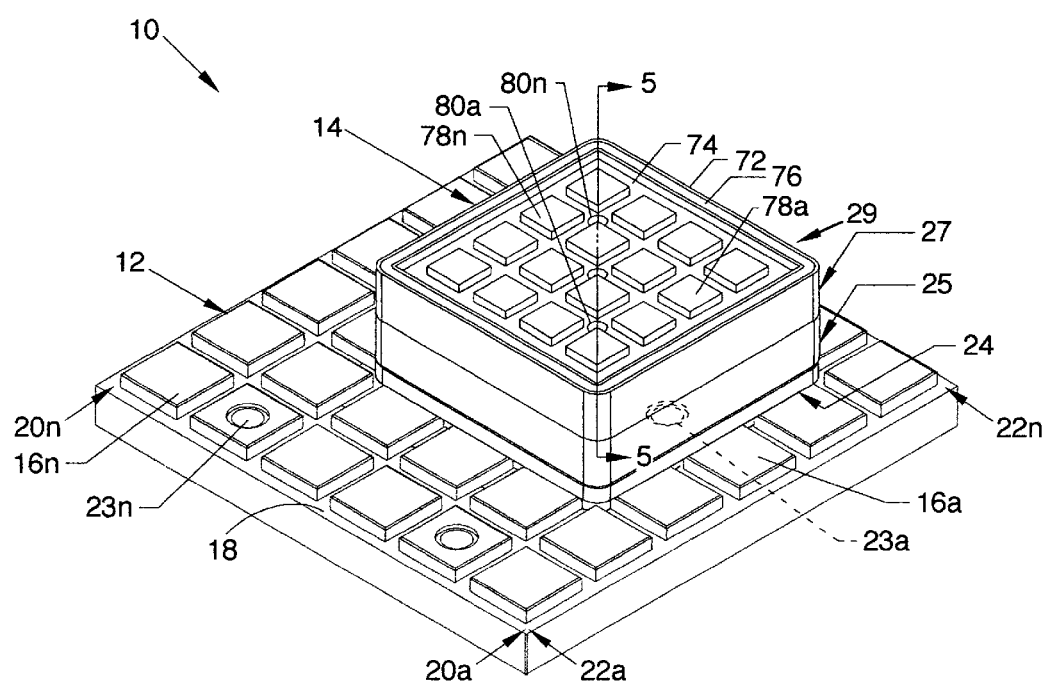
FIG. 1 is an assembled isometric view of the positionable vacuum clamp system, the present invention, showing in particular the upper surfaces of the externally viewable components of the positionable vacuum clamp system.
Figure 2:
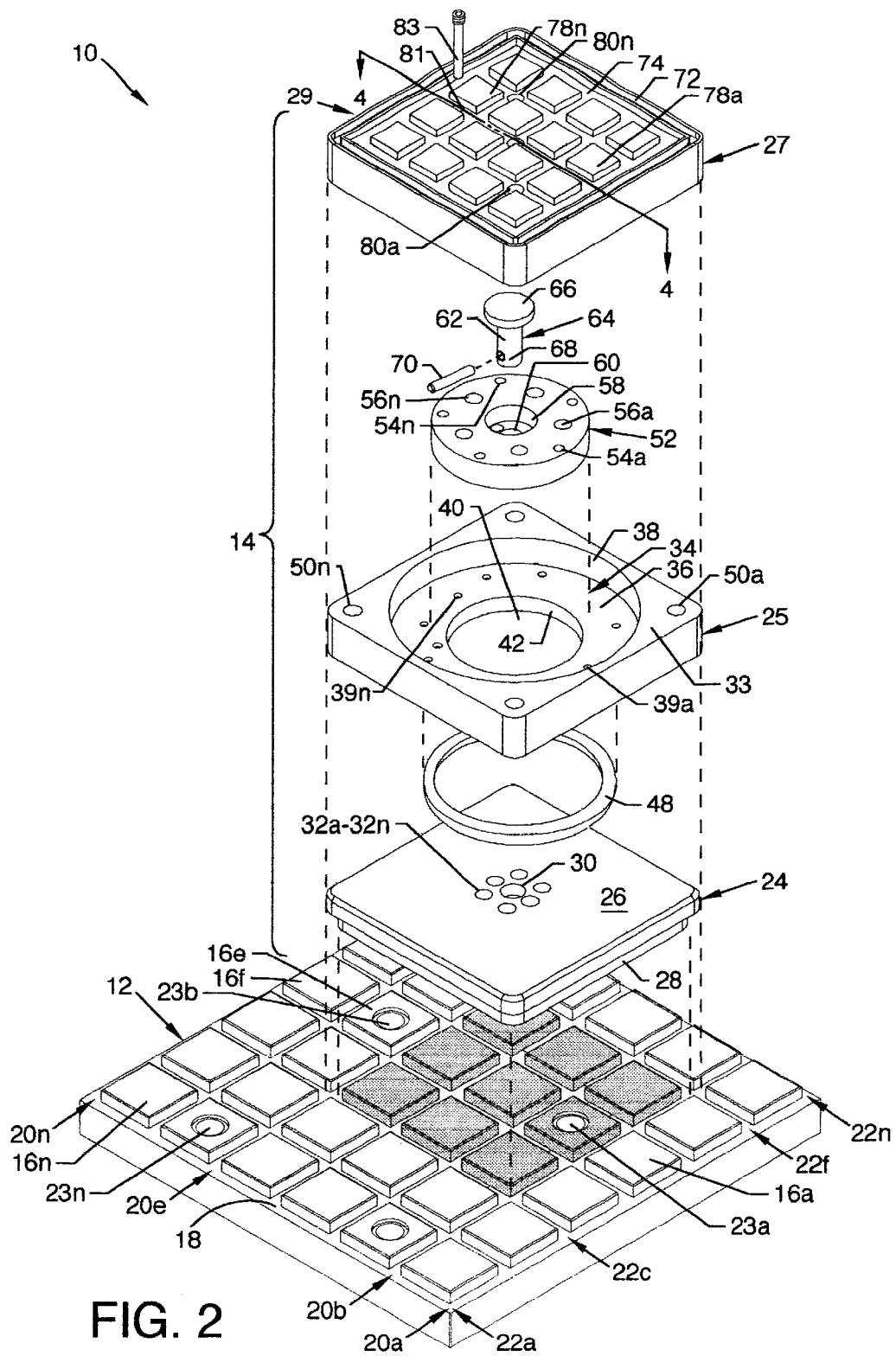
FIG. 2 is an exploded isometric view showing in particular the upper surfaces of the components of the positionable vacuum clamp system.

FIG. 1 is an assembled isometric view, and FIG. 2 is an exploded isometric view of the positionable vacuum clamp system 10, the present invention, showing, in particular, the upper surfaces of the components of the present invention. The positionable vacuum clamp system 10 includes a vacuum table 12 and one or more positionable vacuum clamps 14 which mutually accommodate each other. The vacuum table 12 can be of any desired size to accommodate any number of positionable vacuum clamps 14; however, only a small vacuum table 12 and one positionable vacuum clamp 14 are shown for purposes of brevity. The vacuum table 12 serves as a mount for the positionable vacuum clamp 14 and serves to deliver vacuum to and through the positionable vacuum clamp 14 for holding a workpiece to the upper surfaces, more specifically to a vacuum mating structure of the positionable vacuum clamp 14. A geometrically configured grid of square alignment fixtures 16a–16n is located at and extends upwardly from an upper surface 18 of the vacuum table 12 having intersecting rows of spaces 20a–20n and spaces 22a–22n extending alongside of or between the alignment fixtures 16a–16n. The geometry of the alignment fixtures 16a–16n and the spaces 20a–20n and 22a–22n therebetween accommodates the geometry of a base plate 24 of the positionable vacuum clamp 14, as later described in detail. A plurality of vacuum ports 23a–23n appropriately located and spaced extend vertically through a portion of the alignment fixtures 16a–16n to provide vacuum from an external vacuum source. The immediately viewable components of the positionable vacuum clamp 14 such as shown in FIG. 1 includes at least the base plate 24, a center plate 25 and a top plate 27.

The base plate 24 is substantially a square structure having a smooth top surface 26 and a downwardly extending lip 28 having rectangular-like attributes and being offset inwardly from the structure perimeter. The lip 28 can align to and engage the square alignment fixtures 16a–16n and adjacent intersecting rows of spaces 20a–20n and spaces 22a–22n to position and fix the positionable vacuum clamp 14 with respect to the vacuum table 12. For purposes of example and demonstration, nine of the square alignment fixtures 16a–16n, shown with shading, and appropriate spaces of the spaces 20a–20n and spaces 22a–22n accommodate the lip 28 of the base plate 24. At least one of the vacuum ports 23a–23n, such as vacuum port 23a, is always available for use to supply vacuum when any group of nine of the alignment fixtures 16a–16n is engaged by the lip 28. A centrally located retainer pin body hole 30 extends through the base plate 24 and is flanked by a plurality of vacuum passages 32a–32n also extending through the base plate 24.

Figure 5:
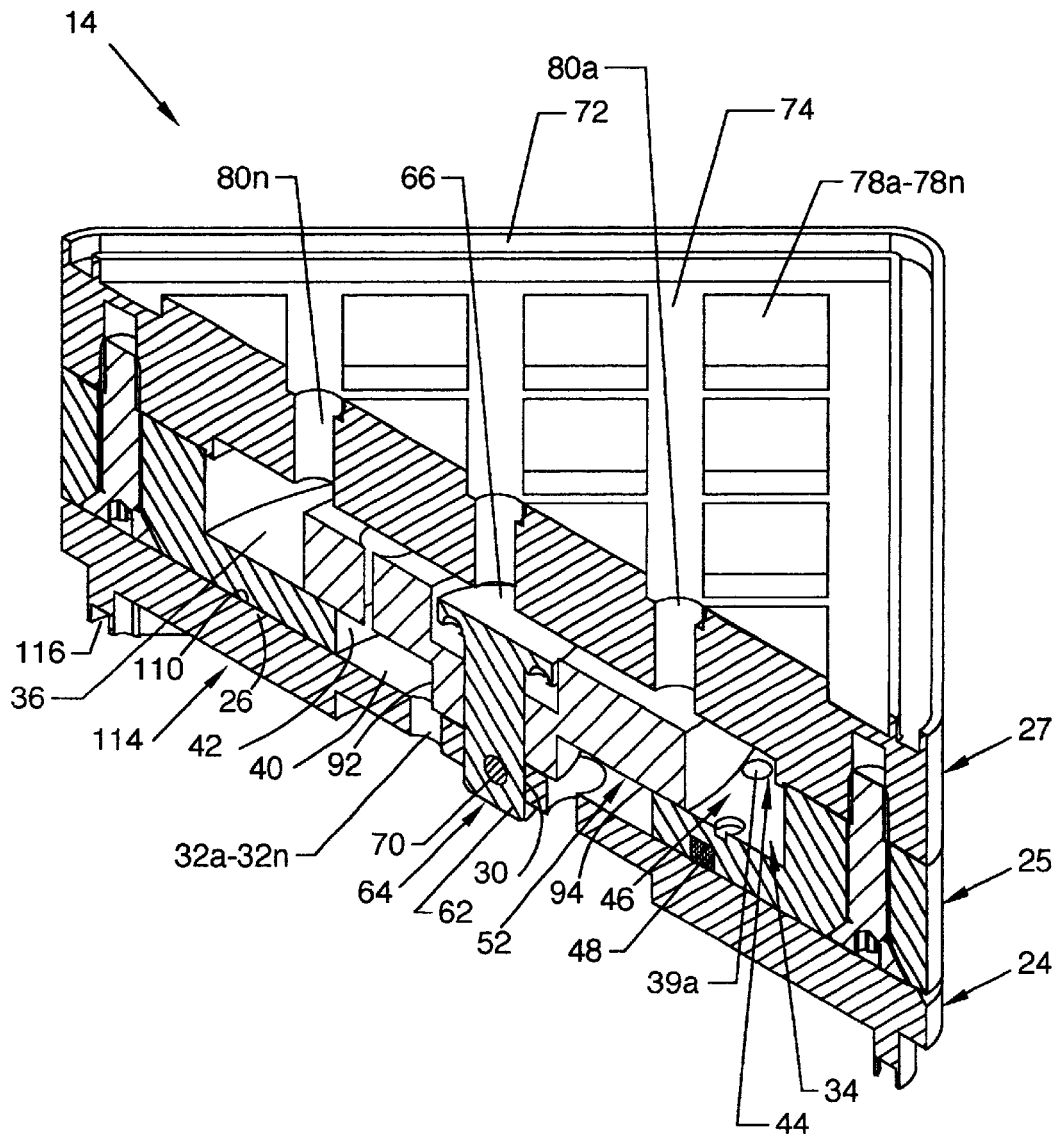
FIG. 5 is a corner-to-corner cross section view of the assembled positionable vacuum clamp along line 5—5 of FIG. 1.

The center plate 25 slidingly aligns to the smooth top surface 26 of the base plate 24. The substantially square center plate 25 includes a centrally located recess 34 which is circular and which extends downwardly from an upper planar surface 33 into the upper portion thereof. A smooth circular surface 36 and an intersecting circular cylindrical surface 38 define the boundaries of the recess 34 which is included in the center plate 25. The recess 34 in the upper central region of the center plate 25 and an opposing lipped recess 44 in the lower region of the top plate 27 (FIG. 3) combine to form a cavity 46 such as shown in FIG. 5 and other figures. A plurality of optional pivot anchor holes 39a–39n are included in the smooth circular surface 36 of the center plate 25. A large vacuum circular passage 40 having a circular cylindrical surface 42 extends downwardly from the smooth circular surface 36. An O-ring 48 seals the lower region of the center plate 25 to the smooth top surface 26 of the base plate 24, as later described in detail. A plurality of body holes 50a–50n are included at the corners of the center plate 25.

The smooth lower circular surface 94 of a retainer washer 52 aligns to the smooth circular surface 36 of the recess 34. The retainer washer 52 includes a plurality of optional pivot pin receptor holes 54a–54n and a plurality of vacuum passages 56a–56n extending therethrough. Also visible in FIG. 2 is an upper and centrally located recess 58, which is circular, including a retainer pin hole 60 which extends vertically and downwardly therefrom for accommodation of a shaft 62 of a retainer pin 64. The retainer pin 64 also includes a head 66 as well as a horizontally oriented hole 68 for accommodation of a keeper pin 70.

The top plate 27 is substantially a square structure including an upper surface arrangement which may be configured in a number of geometrically configured and shaped vacuum mating structures incorporated to accommodate a workpiece, as shown later in detail. One such upper surface arrangement, as shown herein, is a square-shaped vacuum mating structure 29 which includes a channel 72 extending around the upper periphery of the top plate 27 and upwardly from the upper surface 74 of the top plate 27 into which a flexible gasket seal 76 (FIG. 3) aligns. Also included in the square-shaped vacuum mating structure 29 is a plurality of support structures 78*a*–78*n*, such as square supports or other geometrically configured structures, extending upwardly from the upper surface 74 to fully or partially support a workpiece. A plurality of vacuum passages 80*a*–80*n* extend downwardly from the upper surface 74 to intersect the lipped recess 44 shown in FIG. 3. Additionally, one or more optional threaded holes 81 extending downwardly through either the upper surface 74 or the support structures 78*a*–78*n* or even at an intersection of the upper surface 74 and one of the support structures 78*a*–78*n* and through the top plate 27 can accommodate an optional partially threaded pivot pin 83. The optional pivot pin 83 can extend through and slightly beyond one of the close fit optional pivot pin receptor holes 54*a*–54*a* of the retainer washer 52, such as optional pivot pin receptor hole 54*a*, to engage one of the optional pivot anchor holes 39*a*–39*n* in the center plate 25, such as the optional pivot anchor hole 39*n*, for optionally limiting the movement of the center plate 25 and the attached top plate 27 with respect to the retainer washer 52 and other components, as later described in FIG. 11 and other figures.

Figure 3:
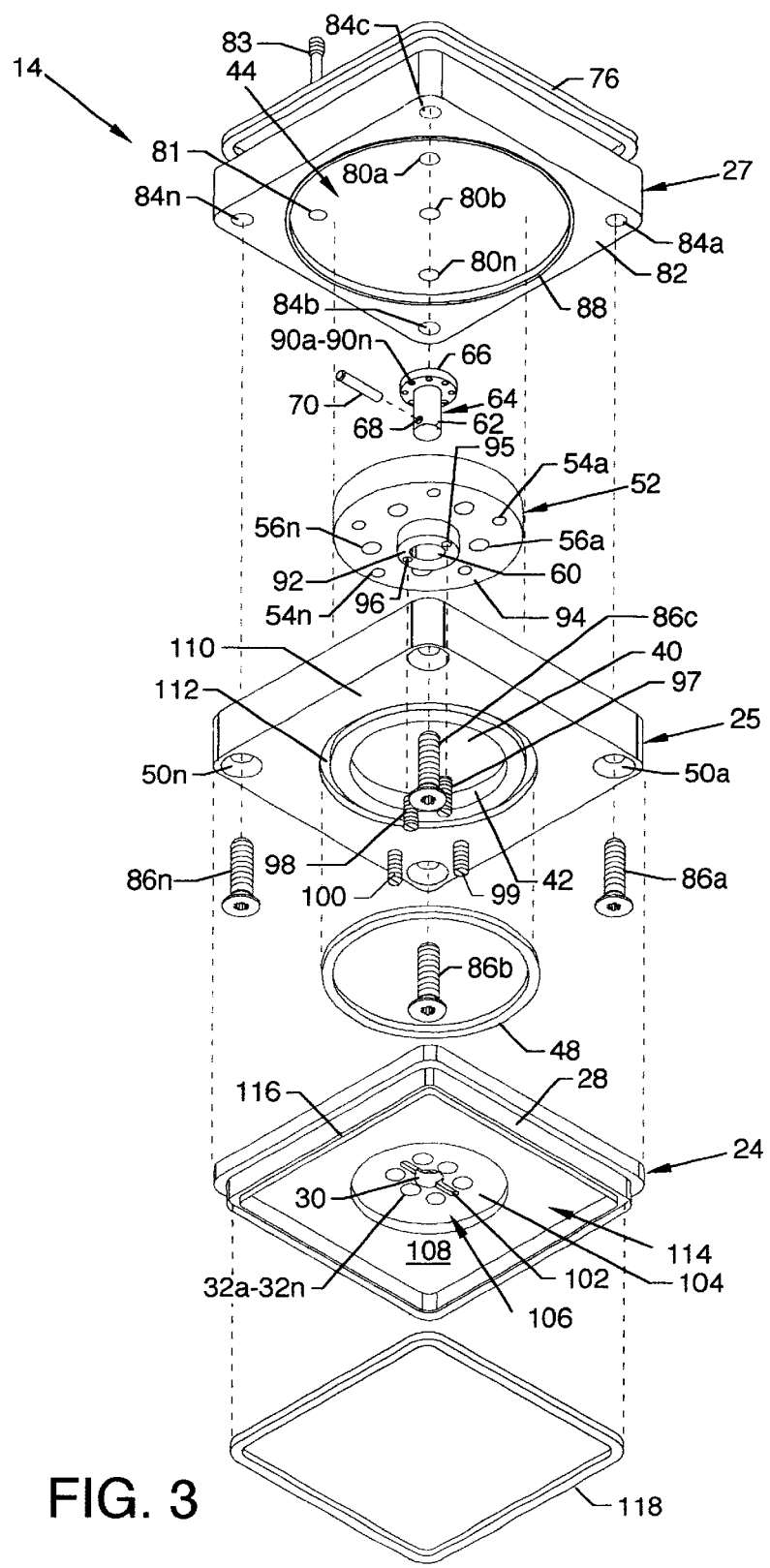
FIG. 3 is an exploded view showing in particular the lower surfaces of the components of the positionable vacuum clamp.

FIG. 3 is an exploded view showing in particular the lower surfaces of the components of the positionable vacuum clamp 14 of the present invention. The lipped recess 44, which is circular, is located at the lower region of the top plate 27. The lipped recess 44 extends upwardly from the planar lower surface 82 of the top plate 27 and is bounded by circular lip 88 extending downwardly from the lower surface 82 of the top plate 27. A plurality of threaded holes 84*a*–84*n* extend upwardly from the corners of the lower surface 82 to accommodate a plurality of machine screws 86*a*–86*n* which extend through the body holes 50*a*–50*n* in the center plate 25.

Additional and some optional features describing the relationship of the retainer pin 64 and the retainer washer 52 are now described and are best understood with additional reference to FIG. 5. The retainer pin 64 engages the retainer pin hole 60 and the recess 58 of the retainer washer 52. The retainer washer 52 includes a centrally located cylindrical extension 92 extending downwardly from the smooth lower circular surface 94 and mid portion thereof. Opposed threaded holes 95 and 96 extend vertically through the cylindrical extension 92 and through the mid portion of the retainer washer 52. Furthermore, the shaft 62 of the retainer pin 64, when it engages the retainer washer 52, extends downwardly beyond the retainer pin hole 60 to engage and to extend slightly beyond the body hole 30 of the base plate 24 to amply expose the hole 68. Set screws 97 and 98, which threadingly engage the threaded holes 95 and 96, respectively, are rotated to frictionally engage the underside of the retainer pin head 66 to force the retainer pin 64 upwardly, as well as to force the recently placed keeper pin 70 extending through the hole 68 of the retainer pin shaft 62 into a slot 102. The keeper pin 70 is passed through the hole 68 and is subsequently made to engage the horizontally oriented slot 102 which intersects the retainer pin body hole 30 at the upper circular surface 104 of a circular recess 106 extending upwardly from the lower planar surface 108 of the base plate 24 as set screws 97 and 98 are made to bear against the retainer pin head 66. The retainer pin 64 can also include a plurality of optional detent holes 90*a*–90*n* distributed along and about the underside of the retainer pin head 66. In lieu of the set screws 97 and 98, optional spring plunger assemblies 99 and 100 can threadingly engage the threaded holes 95 and 96, respectively, in pending alignment with the opposing optional detent holes 90*a*–90*n* on the underside of the retainer pin head 66 to allow the upper regions of the spring plunger assemblies 99 and 100 to detentingly engage an opposing pair of optional detent holes 90*a*–90*n*. Either of the above arrangements affixes the retainer pin 64 and retainer washer 52 with respect to the base plate 24. During such pinning of the retainer pin 64 to the base plate 24, the smooth lower circular surface 94 of the retainer washer 52 is held against the smooth circular surface 36 of the recess 34 in the center plate 25 (FIG. 2). The optional detenting arrangement allows rotational detented movement in predetermined increments of the center plate 25 and attached top plate 27 with respect to the base plate 24, or the center plate 25 and attached top plate 27 can be rotated without the benefit of detenting if the detenting option is not utilized.

The center plate 25 includes a lower planar surface 110 and a circular groove 112 extending upwardly from the lower planar surface 110 to accommodate the O-ring 48 which is disposed between the center plate 25 and the smooth top surface 26 (FIG. 2) of the base plate 24 to slidingly seal the lower central region of the center plate 25 bounded by the O-ring 48 and the large vacuum passage 40 to a central region of the smooth top surface 26 of the base plate 24 including the area around and about the vacuum passages 32*a*–32*n*.

The base plate 24 includes a cavity 114 located at the lower region thereof which is bounded by the lip 28, the lower planar surface 108, and the circular recess 106. The cavity 114 accommodates a portion of the alignment fixtures 16*a*–16*n*, as previously described, in concert with the lip 28 which is accommodated by a portion of the spaces 20*a*–20*n* and 22*a*–22*n* along and between the alignment fixtures 16*a*–16*n*, as previously described. Included in the lower extents of the lip 28 is a continuous channel 116 which accommodates a flexible gasket seal 118 which seals the base plate 24 and thus the entire positionable vacuum clamp 14 to the upper surface 18 of the vacuum table 12.

Figure 4:
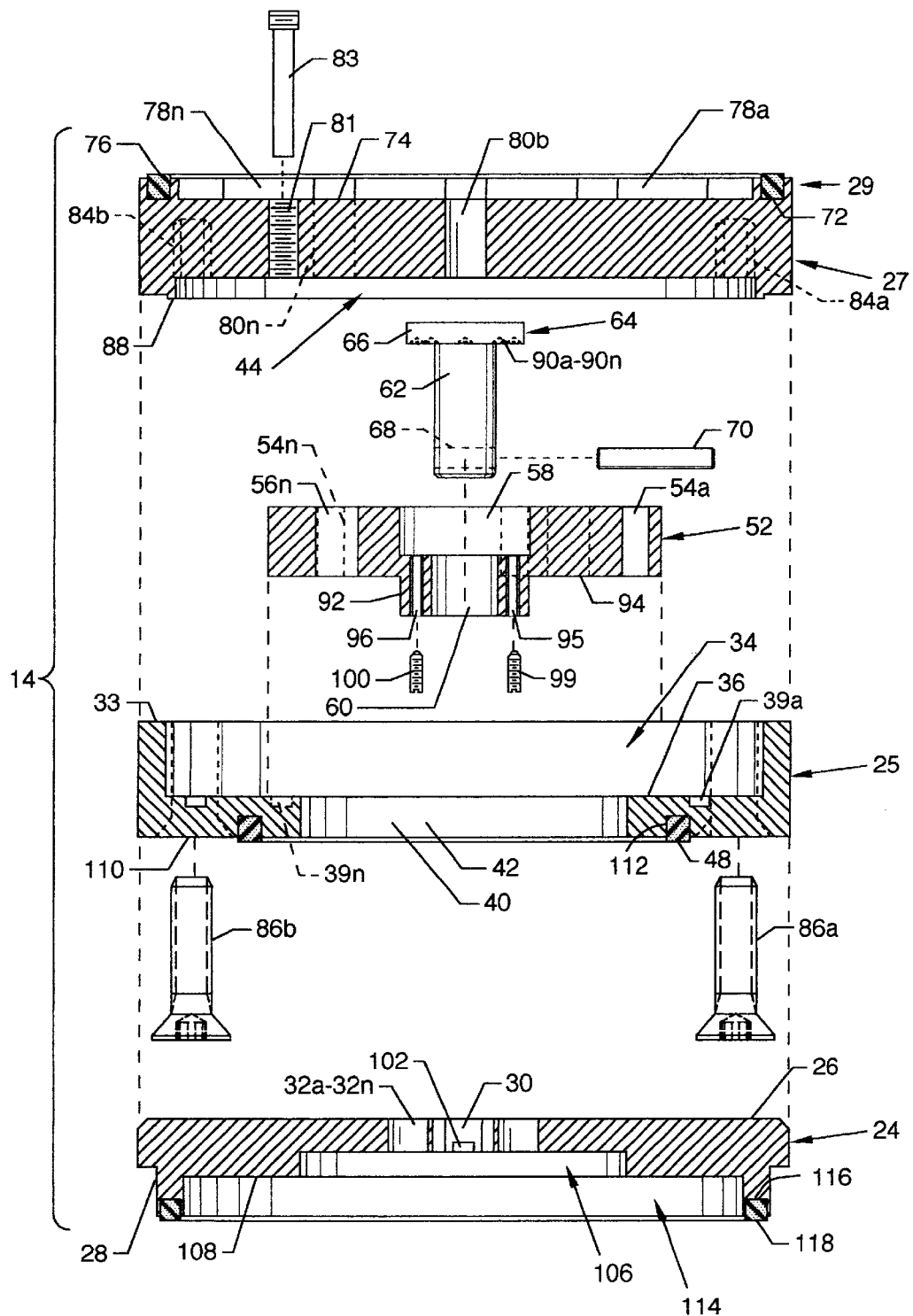
FIG. 4 is an exploded cross section view of the positionable vacuum clamp along line 4—4 of FIG. 2.

FIG. 4 is an exploded cross section view of the positionable vacuum clamp 14 along line 4—4 of FIG. 2.

FIG. 5 is a corner-to-corner cross section view of the assembled positionable vacuum clamp 14 along line 5—5 of FIG. 1. Illustrated in particular is the relationship of the retainer washer 52 and retainer pin 64 to the surrounding structure including the top plate 27, the center plate 25 and the base plate 24. In particular, the lower annular smooth surface 94 of the retainer washer 52 is aligned to and in intimate contact the planar and smooth circular surface 36 of the center plate 25 and is secured to the base plate 24 as previously described. In the illustration, the retainer washer 52 is shown centered over and about the large vacuum passage 40 central to the center plate 25 and is shown centered in the cavity 46 formed by the recess 34 and lipped recess 44. The circular extension 92 of the retainer washer 52 is shown centered in the large vacuum passage 40 which is bounded by the circular cylindrical surface 42 which is in the lower region of the center plate 25. The joined top plate 27 and center plate 25 can be slidingly maneuvered manually to a desired position prior to application of vacuum where the lower planar surface 110 of the center plate 25 is slidingly positioned with respect to the smooth top surface 26 of the base plate 24. Such sliding positioning varies the relationship of the retainer washer 52 in the cavity 46 surrounding and encompassing the retainer washer 52 where the cavity 46 is positioned about the retainer washer 52 by the positioning of the combined top plate 27 and center plate 25.

Figure 6:
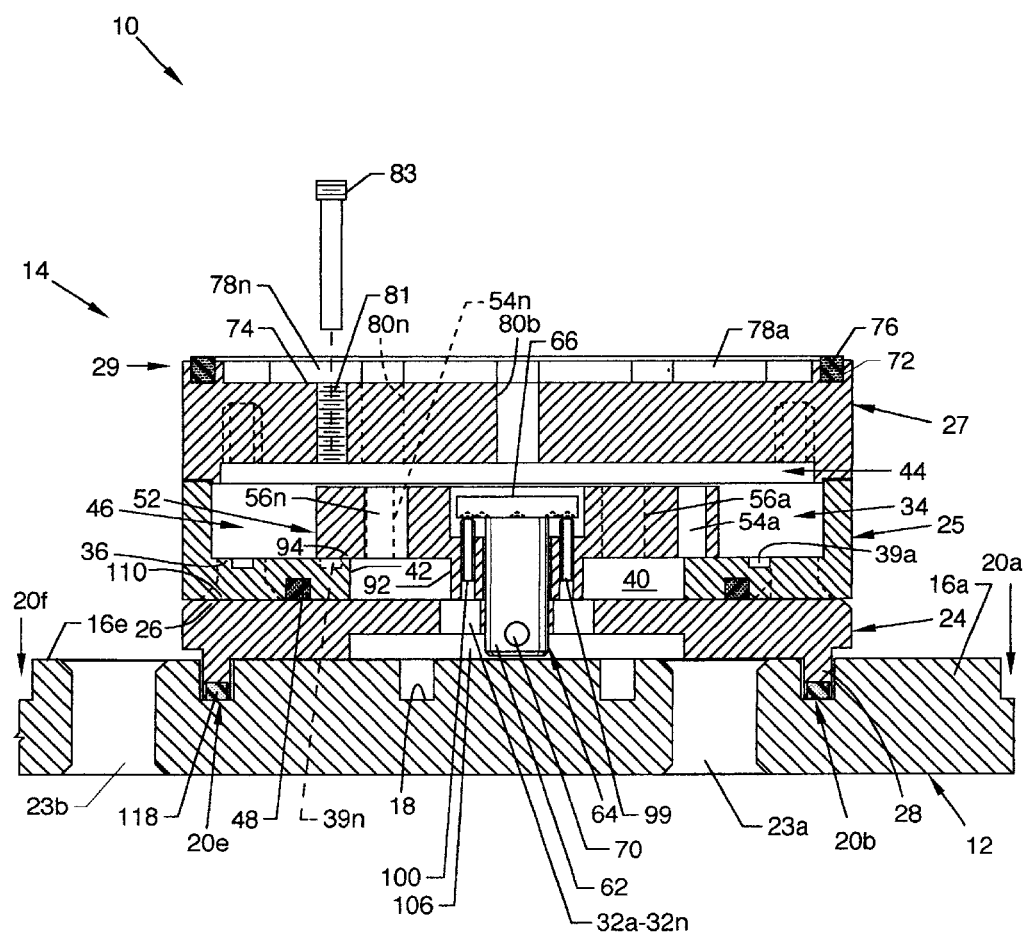
FIG. 6 is a cross section view of the assembled positionable vacuum clamp of FIG. 4 aligned to the vacuum table.

FIG. 6 is a cross section view of the assembled positionable vacuum clamp 14 of FIG. 4 aligned to the vacuum table 12, also shown in cross section, the components of which form the positionable vacuum clamp system 10. In this view the top plate 27 and the center plate 25 are shown centered about the retainer washer 52 in symmetrical fashion. The lip 28 of the base plate 24 aligns and seals via the flexible gasket seal 118 to the spaces 20b and 20e and the spaces 22c and 22f (FIG. 2) about the appropriate alignment fixtures 16a–16n as shown in shading in FIG. 2, thus sealing the vacuum table 12 to the positionable vacuum clamp 14. Vacuum is delivered to the vacuum ports 23a–23n in the vacuum table 12, such as vacuum port 23a, to communicate through and around the components of the positionable vacuum clamp 14 to provide vacuum to the square-shaped vacuum mating structure 29 at the upper region of the top plate 27 in order to hold a workpiece. Vacuum communicates through the vacuum port 23a and through connected passages, recesses or regions of the positionable vacuum clamp 14, including the circular recess 106, the vacuum passages 32a–32n, the large vacuum passage 40, the vacuum passages 56a–56n, the cavity 46 formed by the recess 34 and the lipped recess 44 and then through the vacuum passages 80a–80n extending upwardly to the region of the top plate 27 bounded by the upper surface 74, the support structures 78a–78n, the channel 72, and the flexible gasket seal 76, i.e., the square-shaped vacuum mating structure 29, in order to hold the workpiece (not shown) by vacuum.

FIGS. 7, 9, 10, 12 and 13 illustrate various positioning of the center plate 25 and correspondingly the position of the top plate 27 with respect to the base plate 24. The top plate 27 is referred to, but not shown for purposes of brevity and clarity, and is understood to be in its normal attached position where the top plate 27 is secured to the center plate 25 during normal operation.

Figure 7:
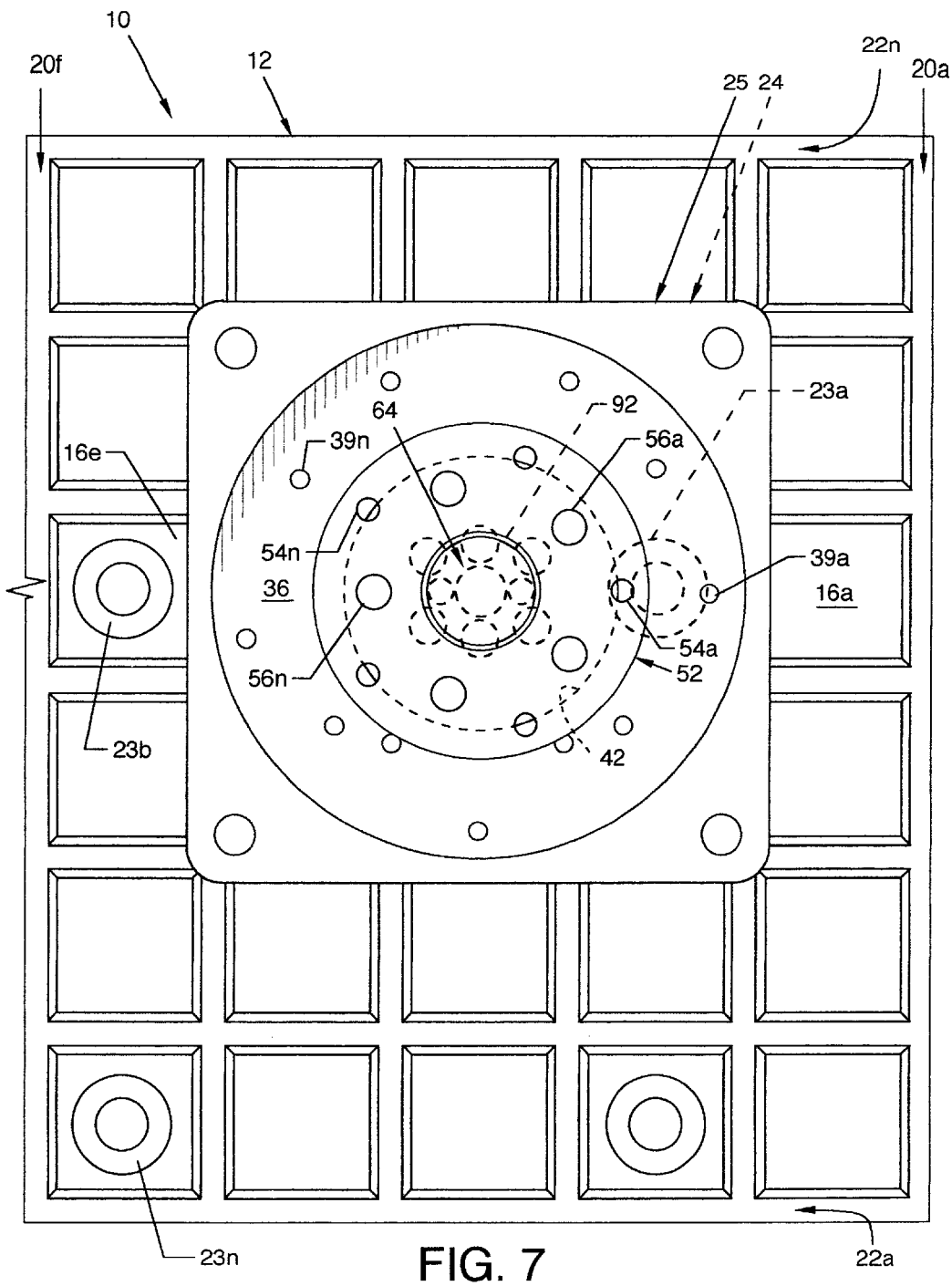
FIG. 7 is a top view of the positionable vacuum clamp system with the top plate removed to illustrate the relationship of the center plate in centered alignment to the retainer washer.

FIG. 7 is a top view of the positionable vacuum clamp system 10 with the top plate 27 removed to illustrate the relationship of the center plate 25 which is in centered alignment to the retainer washer 52 and where the vacuum passages 56a–56n are in full unrestricted communication with the underlying large vacuum passage 40 the edge of which is shown by the circular cylindrical surface 42. Also shown is the overlapping alignment of the retainer washer 52 of which the entire periphery of the smooth lower circular surface 94 (FIG. 6) is always in intimate contact with the smooth circular surface 36 surrounding the upper region of the circular cylindrical surface 42 of the center plate 25.

Figure 8:
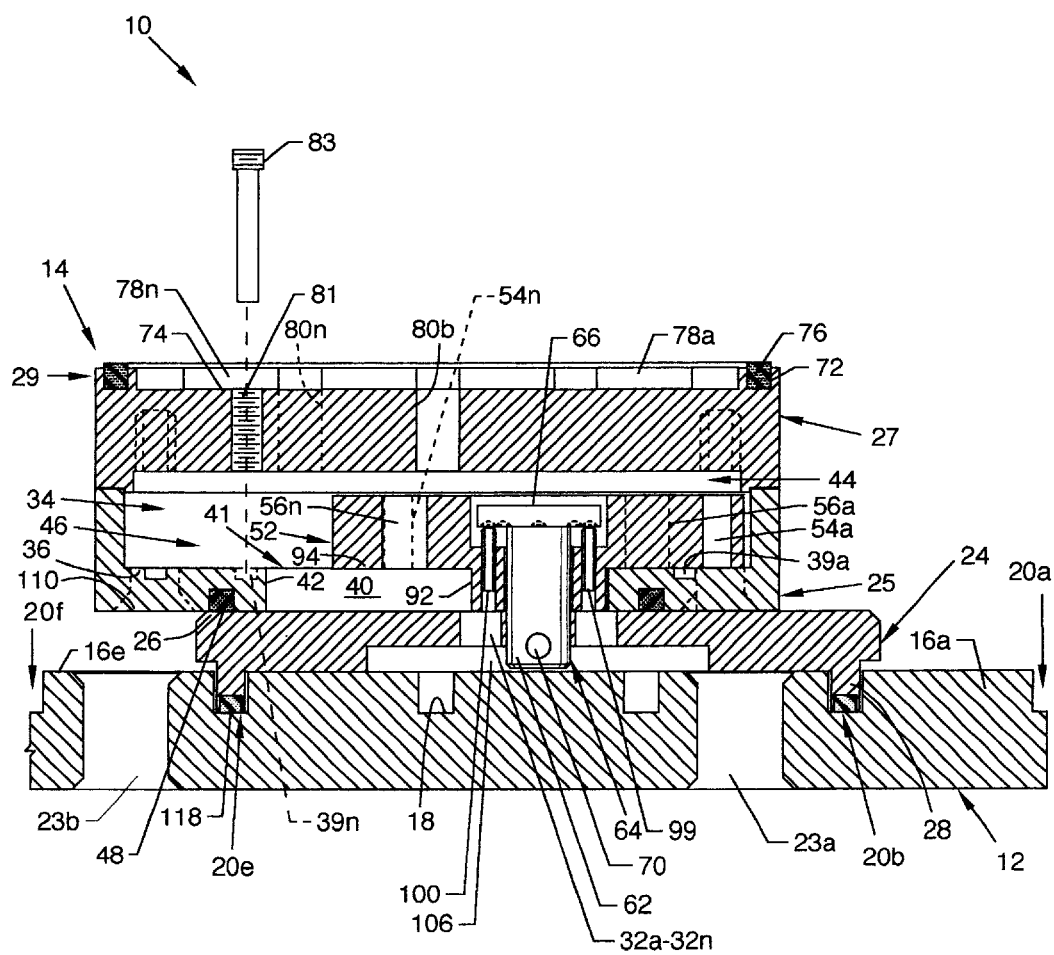
FIG. 8 is a cross section view of the same components shown in FIG. 6 but with the top plate and the center plate positioned off-center to the left from the retainer washer.

FIG. 8 is a cross section view of the same components shown in FIG. 6 but with the top plate 27 and the attached center plate 25 positioned off-center to the left from the retainer washer 52, yet offering vacuum communication from the vacuum port 23a to the square-shaped vacuum mating structure 29 of the top plate 27 through slightly different paths. During such positioning, the vacuum passage 56a, and frequently other vacuum passages adjacent thereto, depending on the amount of repositioning, will be blocked or partially blocked while the remaining unblocked or partially unblocked vacuum passages 56a–56n are utilized for vacuum communication between the large vacuum passage 40 and the upper region of the cavity 46. Additionally, vacuum also communicates from the large vacuum passage 40 around a gap 41 at one end of the retainer washer 52 and a portion of the upper region about the circular cylindrical surface 42 into the cavity 46 where the end of the retainer washer 52 is no longer in intimate contact with the smooth circular surface 36 of the center plate 25. Thus, vacuum communicates through the vacuum port 23a and through connected passages, recesses or regions of the positionable vacuum clamp 14 including the annular recess 106, a greater portion of the vacuum passages 32a–32n, the large vacuum passage 40, a portion of the vacuum passages 56a–56n and the gap 41 into the cavity 46 formed by the recess 34 and lipped recess 44, and then, as previously described, through the vacuum passages 80a–80n extending upwardly to the region of the top plate 27 bounded by the upper surface 74, the support structures 78a–78n, the channel 72, and the flexible gasket seal 76 in order to hold the workpiece (not shown) by vacuum.

Figure 9:
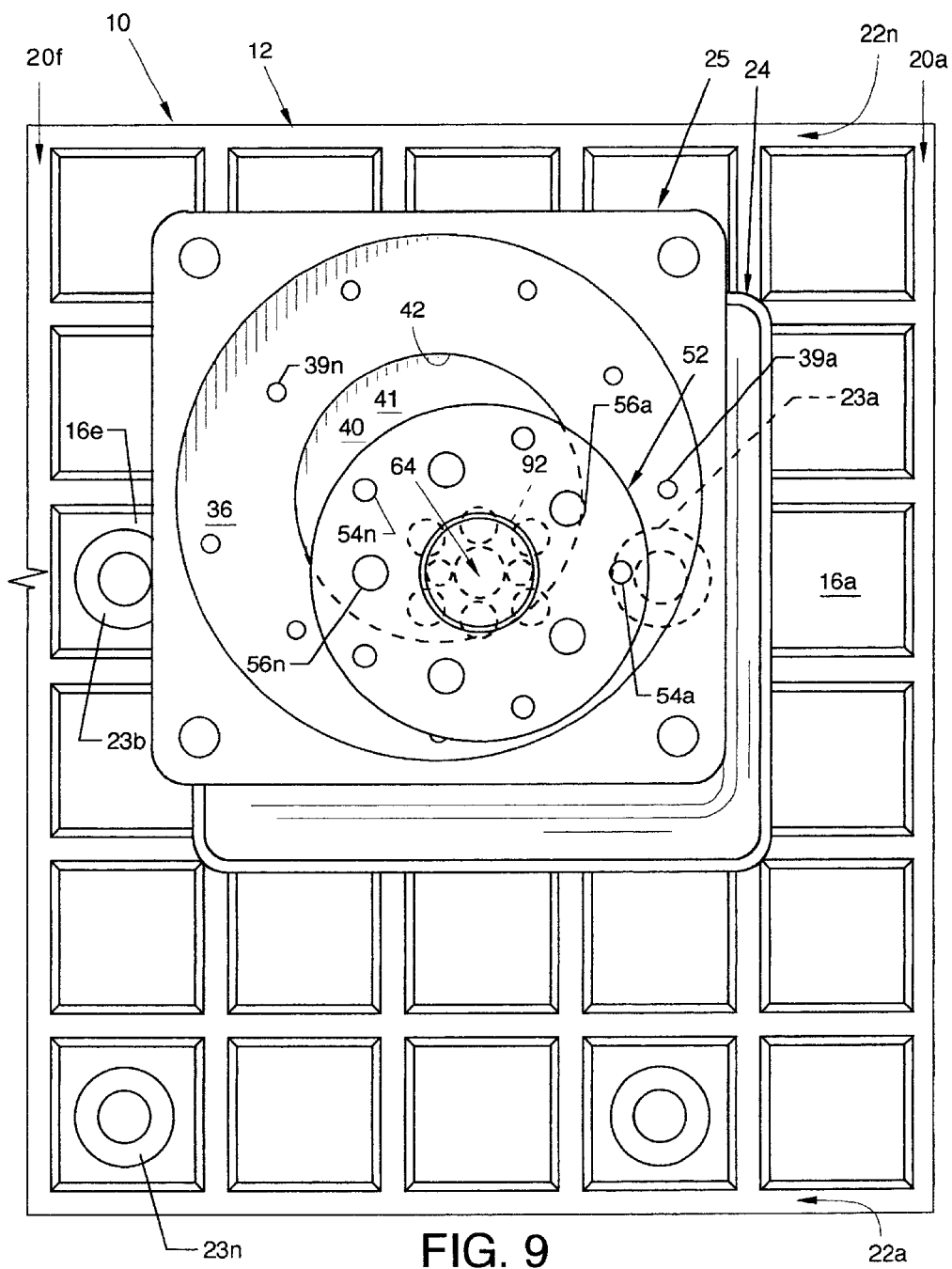
FIG. 9 is a top view of the positionable vacuum clamp system with the top plate removed to illustrate the relationship of the center plate which has been slidingly positioned to the left and rearwardly with respect to the retainer washer.

FIG. 9 is a top view of the positionable vacuum clamp system 10 with the top plate 27 removed to illustrate the relationship of the center plate 25 which has been slidingly positioned to the left and rearwardly with respect to the retainer washer 52 and where a portion of the vacuum passages 56a–56n are either fully or partially blocked and where a portion of the vacuum passages 56a–56n are fully or partially unblocked, the latter of which are in communication with the underlying large vacuum passage 40, the edge of which is shown by the circular cylindrical surface 42. Also shown is the partial overlapping alignment of the retainer washer 52 of which the periphery of the smooth lower circular surface 94 (FIG. 6) is in partial intimate contact with the smooth circular surface 36 of the center plate 25. Also shown is the gap 41, having a crescent shape, created between a portion of the retainer washer 52 and a portion of the upper region about the circular cylindrical surface 42. The azimuthal positioning of the center plate 25 along with the attached top plate 27 is limited by engagement of the circular extension 92 with the circular cylindrical surface 42 extending downwardly from the smooth circular surface 36. It can be appreciated that the center plate 25, along with the attached top plate 27, can be positioned in a plurality of positions, as required, with respect to the retainer washer 52, and that sufficient vacuum communication is maintained with any positional relationship of the center plate 25 and attached top plate 27 to the retainer washer 52.

Figure 10:
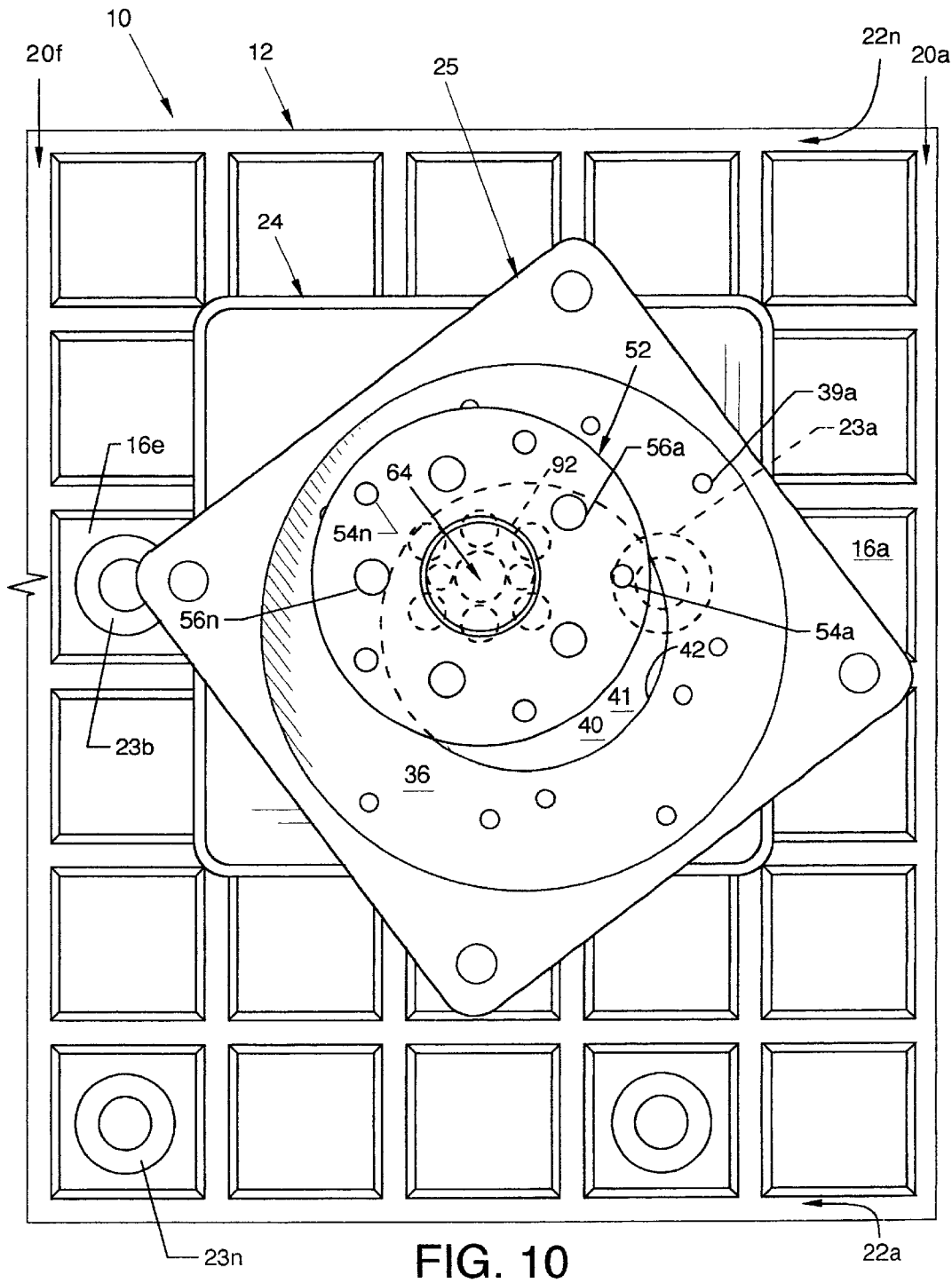
FIG. 10 is a top view of the positionable vacuum clamp system with the top plate removed and with the center plate slidingly positioned azimuthally with respect to the retainer washer and also rotationally positioned about the vertical axis of the center plate.

FIG. 10 is a top view of the positionable vacuum clamp system 10 and illustrates another desirable attribute of the invention where the center plate 25 and attached top plate 27 (not shown), as well as being slidingly positioned azimuthally from a different position with respect to the retainer washer 52, such as shown in FIG. 9, has also been rotationally positioned about the vertical axis of the center plate 25 and attached top plate 27 (not shown) to offer yet more positional solutions to accommodate the shape of the workpiece.

Figure 11:
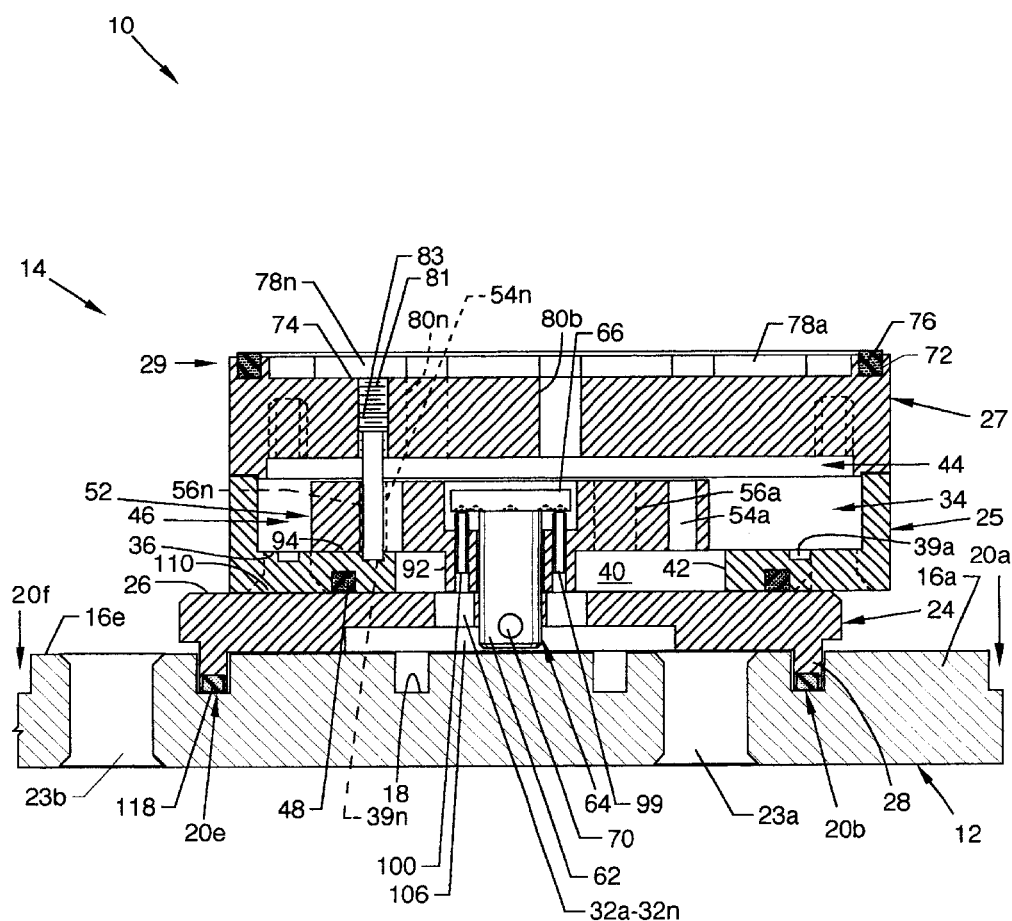
FIG. 11 is a cross section view similar to FIG. 6 showing the use of the optional pivot pin which is involved with limiting the range of movement of the center plate and attached top plate with respect to the base plate.
Figure 13:
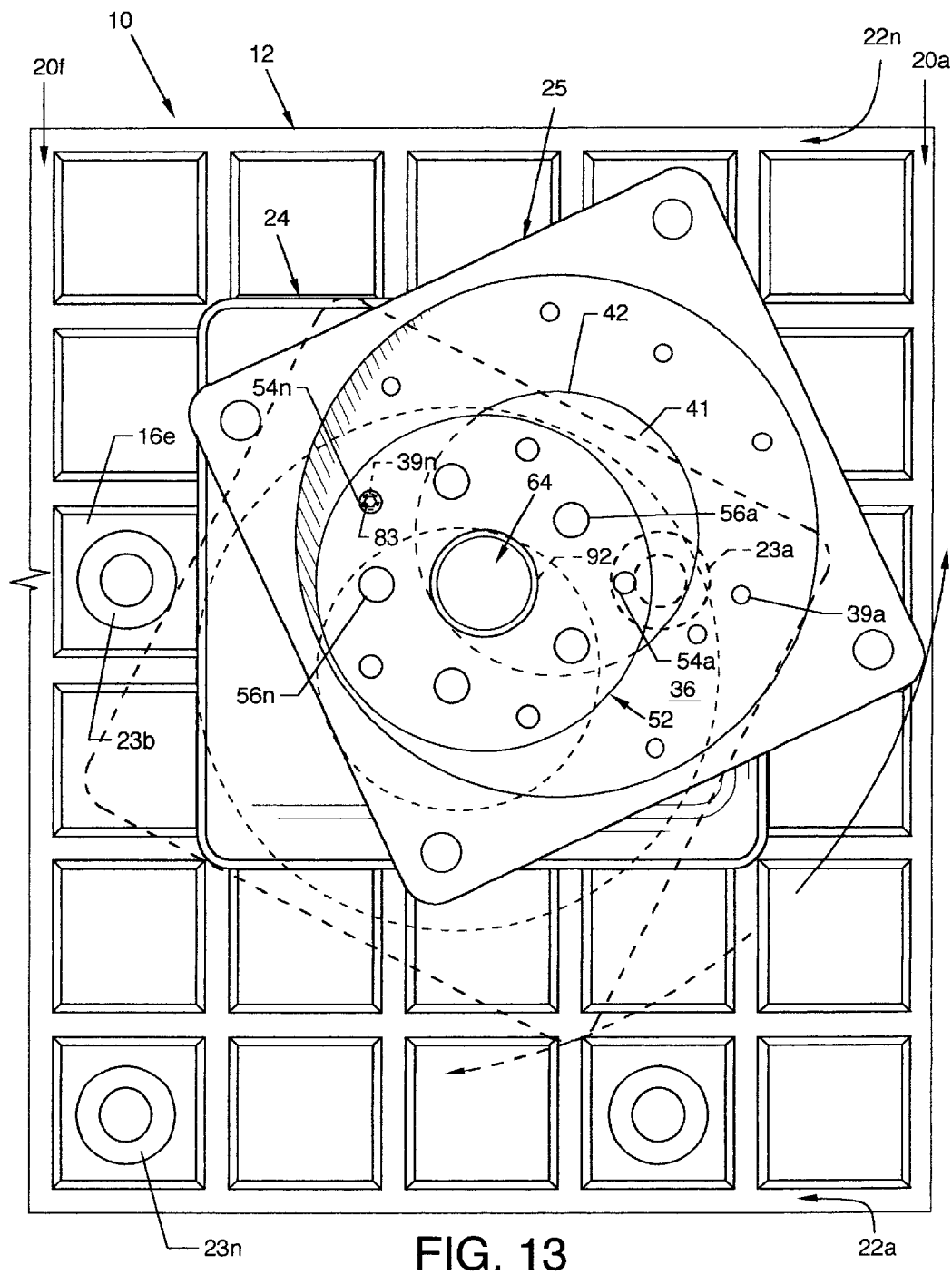
FIG. 13 illustrates the components shown in FIG. 12 where the center plate and top plate (not shown) have been positionally pivoted in a counterclockwise direction about the optional pivot pin until a circular cylindrical surface of the center plate impinges the cylindrical extension of the retainer washer to reach a range limit.

FIG. 11 is a cross section view similar to FIG. 6 showing the use of the optional pivot pin 83 which is involved with limiting the range of movement of the center plate 25 and attached top plate 27 with respect to the base plate 24, the operational method of which and the predetermined range limits of which are shown later in detail. Such a predetermined range limitation acts as opposed setting stops and is useful where one of the range limits of the predetermined range limits is incorporated to define a frequently used and desirable angular setting which is incorporated for best alignmental mating of the top plate 27 to the underlying geometry of the workpiece. The threaded hole 81 in the top plate 27 engages the upper region of the optional pivot pin 83 which is threaded. The shaft of the optional pivot pin 83 extends downwardly to closely engage one of the optional pivot pin receptor holes 54a–54n in the stationary retainer washer 52, such as the optional pivot pin receptor hole 54n for purpose of example, and is seated into one of the optional pivot anchor holes 39a–39n, such as the optional pivot anchor hole 39n. Such engagemental anchoring pivotally secures the center plate 25 and attached top plate 27 to the retainer washer 52, whereby the center plate 25 and attached top plate 27 can be pivotally positioned about the optional pivot pin 83. Pivoting of the center plate 25 and attached top plate 27 about the optional pivot pin 83 is limited by the impingement of the cylindrical extension 92 of the retainer washer 52 at either of two opposing tangential contact regions, which are range limits, with the circular cylindrical surface 42 of the center plate 25, such as shown in FIG. 13. One of the range limitations is utilized as a stop at an instance, but at another instance the opposing range limit could be utilized as a stop. Additional holes, such as threaded hole 81, can be incorporated in the same manner for use with the optional pivot pin 83 and optional pivot pin receptor holes 54a–54n and optional pivot anchor holes 39a–39n for various other predetermined range limit positionings or fixations of the center plate 25 and attached top plate 27 with respect to the base plate 24 where the extents of pivotal rotation are determined by contact of the cylindrical extension 92 with the circular cylindrical surface 42.

Additionally, a second optional pivot pin 83 (not shown) utilized with a different aligned set of optional pivot pin receptor holes 54a–54n and optional pivot anchor holes 39a–39n in combined cooperation with the placement of the first optional pivot pin 83 could be incorporated for two-point anchored settings where the range limit extents are not reached, such as where the cylindrical extension 92 of the retainer washer 52 does not contact the circular cylindrical surface 42 of the center plate 25.

Figure 12:
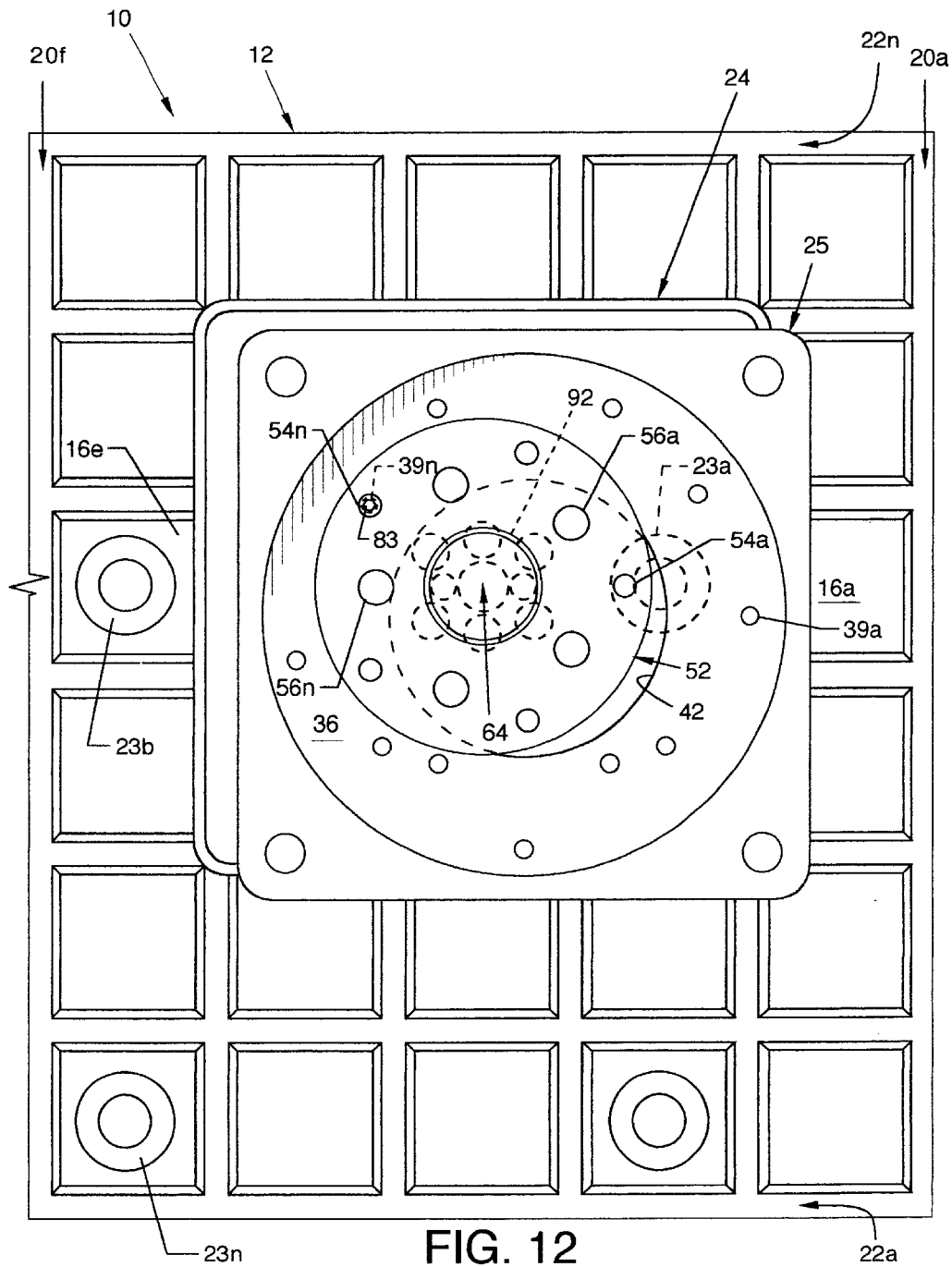
FIG. 12 is a top view of the positionable vacuum clamp system with the top plate removed to illustrate the accommodation of the optional pivot pin where the optional pivot pin would engage the threaded hole (not shown) of the top plate and where the optional pivot pin engages an optional pivot pin receptor hole of the retainer washer and an optional pivot anchor hole of the center plate.

FIG. 12 is a top view of the positionable vacuum clamp system 10 with the top plate 27 removed to illustrate the accommodation of the optional pivot pin 83, which of course engages the threaded hole 81 (not shown) of the top plate 27, by the optional pivot pin receptor hole 54n of the retainer washer 52 and by the optional pivot anchor hole 39n of the center plate 25. Shown in particular is one of the many positions the top plate 27 and the center plate 25 can assume prior to pivotal rotation in either direction about the optional pivot pin 83 and prior to any subsequent contact of the cylindrical extension 92 of the retainer washer 52 by the circular cylindrical surface 42 of the center plate 25.

FIG. 13 illustrates the components shown in FIG. 12 where the center plate 25 and top plate 27 (not shown) are positionally pivoted in a counterclockwise direction about the optional pivot pin 83 until the circular cylindrical surface 42 of the center plate 25 impinges the cylindrical extension 92 of the retainer washer 52, which is, of course, a range limit. As shown completely in dashed lines, an opposing range limit can be reached by positionally pivoting the center plate 25 and top plate 27 (not shown) in a clockwise direction until the circular cylindrical surface 42 of the center plate 25 impinges the cylindrical extension 92 of the retainer washer 52.

Figure 14:
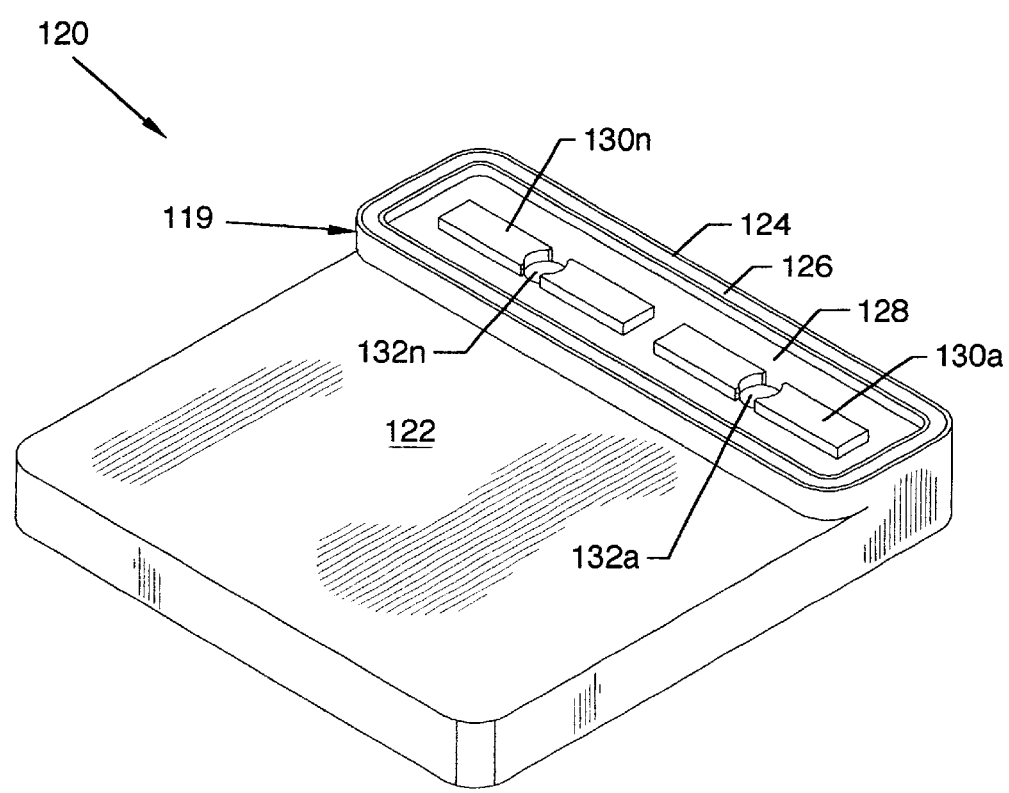
FIG. 14 illustrates a top plate which is interchangeable with and constructed much the same as the top plate shown in the previous figures, but having a rectangular-shaped vacuum mating structure; and, FIG. 15 illustrates a top plate which is interchangeable with and constructed much the same as the top plates shown in the previous figures, but having an L-shaped vacuum mating structure.

FIG. 14 illustrates a top plate 120 which is interchangeable with and constructed much the same as the top plate 27 shown in the previous figures, but having a rectangular-shaped vacuum mating structure 119 which allows for vacuum accommodation of workpieces which are of a narrow profile or part of a narrow profile and/or which provides a recessed planar surface 122 for tool clearance located adjacent and at a lower level with respect to the rectangular-shaped vacuum mating structure 119. The rectangular-shaped vacuum mating structure 119 includes a channel 124, a gasket seal 126, an upper surface 128, a plurality of support structures 130a–130n such as rectangular supports or other geometrically configured structures extending upwardly from the upper surface 128 to fully or partially support a narrow workpiece, a plurality of vacuum passages 132a–132n extending downwardly through the upper surface 128 or through the rectangular support structures 130a–130n, as shown, to intersect a lipped recess similar to the lipped recess 44 shown in FIG. 3.

Figure 15:
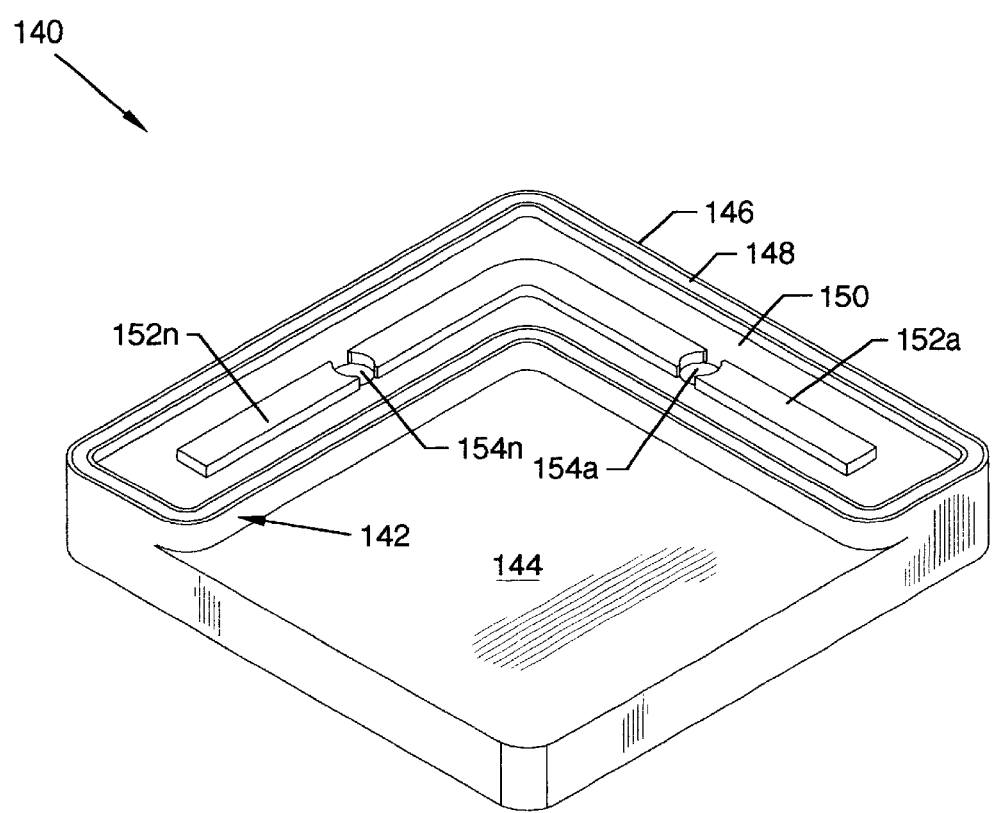

FIG. 15 illustrates a top plate 140 which is interchangeable with and constructed much the same as the top plate 27 and the top plate 120 shown in the previous figures, but having an L-shaped vacuum mating structure 142 which allows for vacuum accommodation of workpieces which are of a narrow and angled profile or part of a narrow and angled profile and/or which provides a recessed planar surface 144 for tool clearance located adjacent and at a lower level with respect to the L-shaped vacuum mating structure 142. The L-shaped vacuum mating structure 142 includes a channel 146, a gasket seal 148, an upper surface 150, a plurality of intersecting support structures 152a–152n, such as rectangular-like supports or other geometrically configured structures, extending upwardly from the upper surface 150 to fully or partially support a narrow or angled profile workpiece, a plurality of vacuum passages 154a–154n extending downwardly through the upper surface 150 or through the intersecting rectangular-like support structures 152a–152n, as shown, to intersect a lipped recess similar to the lipped recess 44 shown in FIG. 3.

MODE OF OPERATION

One or more positionable vacuum clamps 14 which can include square-shaped vacuum mating structure 29, rectangular-shaped vacuum mating structure 119, L-shaped mating structure 142, or other suitably-shaped vacuum mating structures are placed at desired positions along and about the alignment fixtures 16a–16n and spaces 20a–20n and 22a–22n of the vacuum table 12. The attached center plate 25 and top plate 27 are manually positioned to a position best suited to apply vacuum on the underside of the workpiece and vacuum is applied to secure the workpiece thereto. Vacuum communicates through the vacuum table 12 and through the vacuum passages or other structures of the positionable vacuum clamp 14, as previously described, to provide vacuum at the mating structure, whereupon the workpiece is held by vacuum thereto.

Various modifications can be made to the present invention without departing from the apparent scope hereof.

PARTS LIST 10 positionable vacuum clamp system
12 vacuum table
14 positionable vacuum clamp
16a–n alignment fixtures
18 upper surface
20a–n spaces
22a–n spaces
23a–n vacuum ports
24 base plate
25 center plate
26 smooth top surface
27 top plate 28 lip
29 square-shaped vacuum mating structure
30 retainer pin body hole
32a–n vacuum passages
33 upper planar surface
34 recess
36 smooth circular surface
38 circular cylindrical surface
39a–n optional pivot anchor holes
40 large vacuum passage
41 gap
42 circular cylindrical surface
44 lipped recess
46 cavity
48 O-ring
50a–n body holes
52 retainer washer
54a–n optional pivot pin receptor holes
56a–n vacuum passages
58 recess
60 retainer pin hole
62 shaft
64 retainer pin
66 head
68 hole
70 keeper pin
72 channel
74 upper surface
76 flexible gasket seal
78a–n support structures
80a–n vacuum passages
81 threaded hole
82 lower planar surface (of top plate)
83 optional pivot pin
84a–n threaded holes
86a–n machine screws
88 circular lip
90a–n optional detent holes
92 cylindrical extension
94 smooth lower circular surface
95 threaded hole
96 threaded hole
97 set screw
98 set screw
99 optional spring plunger assembly
100 optional spring plunger assembly
102 slot
104 upper circular surface
106 circular recess
108 lower planar surface
110 lower planar surface
112 circular groove
114 cavity
116 channel
118 flexible gasket seal
119 rectangular-shaped vacuum mating structure
120 top plate
122 recessed planar surface
124 channel
126 gasket seal
128 upper surface
130a–n support structures
132a–n vacuum passages
140 top plate
142 L-shaped vacuum mating structure
144 recessed planar surface
146 channel
148 gasket seal
150 upper surface
152a–n support structures
154a–n vacuum passages

What is claimed is:

1. A vacuum clamp comprising:
   a. a base plate, the base plate having a top planar surface and a bottom surface;
   b. a combined top plate and center plate, the combined top plate and center plate including:
      (1) an upper surface on the top plate;
      (2) a lower planar surface on the center plate;
      (3) a cavity within the combined top plate and center plate; and,
      (4) a vacuum passage extending from the cavity to the lower planar surface;
   c. a retainer, the retainer captured in the cavity, extending through the vacuum passage, and affixed to the base plate, such that lower planar surface of the combined top plate and center plate is slidingly aligned to the top planar surface of the base plate and may be slidingly azimuthally positioned and slidingly rotationally positioned relative to the top planar surface of the base plate; and,
   d. means for communicating vacuum from the bottom surface of the base plate to the vacuum passage and the cavity, and means for communicating vacuum from the cavity to the top surface of the combined top plate and center plate.

2. The vacuum clamp of claim 1, wherein the means for communicating vacuum from the bottom surface of the base plate to the vacuum passage and the cavity and the means for communicating vacuum from the cavity to the upper surface of the top plate remain available so as to maintain vacuum communication from the bottom surface to the top surface while the combined top plate and center plate are slidingly positioned relative to the base plate.

3. The vacuum clamp of claim 1, wherein center plate of the combined top plate and center plate has an upper surface and the cavity of the combined top plate and center plate includes a recess extending downward from the upper surface of the center plate.

4. The vacuum clamp of claim 3, wherein the recess has a cylindrical surface vertical boundary.

5. The vacuum clamp of claim 3, wherein the recess has a circular surface lower boundary.

6. The vacuum clamp of claim 3, wherein the recess is centrally located on the upper surface of the center plate.

7. The vacuum clamp of claim 3, wherein the recess further includes an opposing lipped recess in the top plate.

8. The vacuum clamp of claim 5, wherein the retainer includes a retainer washer, the retainer washer being captured within the cavity.

9. The vacuum clamp of claim 8, wherein the retainer washer has a smooth lower annular surface and the circular surface lower boundary of the recess is smooth, such that the smooth lower surface of the retainer washer has intimate sliding contact with the smooth circular surface lower boundary and may be slidingly maneuvered thereon.

10. The vacuum clamp of claim 9, wherein the retainer washer is secured to the base plate by a retainer pin, the retainer pin having a head, a shaft depending from the head, the shaft passing through the retainer washer and secured to the base plate.

11. The vacuum clamp of claim 10, wherein the retainer washer has a depending cylindrical extension, the depending cylindrical extension of the retainer washer residing within the vacuum passage of the central plate.

12. The vacuum clamp of claim 10, wherein the vacuum passage has a circular cylindrical surface, the circular cylindrical surface of the vacuum passage defining a limit to azimuthal sliding offset of the retainer washer.

13. The vacuum clamp of claim 1, wherein the means for communicating vacuum from the bottom surface of the base plate to the vacuum passage and the cavity includes a plurality of vacuum passages leading through the base plate from the lower surface to planar upper surface of the base plate and wherein at least one of the plurality remains in communication with the vacuum passage of the center plate in any position available to the combined top plate and center plate relative to the base plate.

14. The vacuum clamp of claim 13, wherein all of the plurality are either in communication with the vacuum passage of the center plate or the planar surface of the center plate in any position available to the combined top plate and center plate relative to the base plate.

15. The vacuum clamp of claim 14, further comprising an O-ring slidingly sealing the lower planar surface of the center plate to the upper planar surface of the base plate, the O-ring bounding a region including the vacuum passage of the center plate and an area of the base plate around and about the plurality of vacuum passages.

16. The vacuum clamp of claim 15, wherein the O-ring is carried in a groove extending upward into the planar surface of the center plate.

17. The vacuum clamp of claim 1, wherein the means for communicating vacuum from the cavity to the upper surface of the top plate includes a plurality of vacuum passages and wherein at least one of the plurality remains in communication with the vacuum passage of the center plate in any position available to the combined top plate and center plate relative to the base plate.

18. The vacuum clamp of claim 17, wherein the cavity includes an opposing lipped recess in the top plate and the plurality lead from the opposing lipped recess to the upper surface of the top plate.

19. The vacuum clamp of claim 1, wherein the base plate has a substantially square structure.

20. The vacuum clamp of claim 1, wherein the center plate has a substantially square structure.

21. The vacuum clamp of claim 1, wherein the top plate has a substantially square structure.

22. The vacuum clamp of claim 1, wherein the bottom surface of the base plate includes a downwardly extending lip.

23. The vacuum clamp of claim 22, wherein the downward extending lip bounds a cavity.

24. The vacuum clamp of claim 22, wherein the downward extending lip includes a continuous channel, the continuous channel accommodating a flexible gasket seal.

25. The vacuum clamp of claim 24, wherein the downward extending lip is a substantially square structure, the substantially square structure adapted for aligned sealing interaction with a vacuum table having rows and columns of alignment fixtures.

26. The vacuum clamp of claim 25, wherein the vacuum table has a plurality of regularly distributed vacuum ports and the aligned sealing arrangement overlies at least one of the plurality of regularly distributed vacuum ports.

27. The vacuum clamp of claim 1, wherein the top plate has an upper surface arrangement which is geometrically configured and shaped to accommodate a workpiece to be held by the clamp.

\* \* \* \* \*